United States Patent
Zahora et al.

(10) Patent No.: US 8,638,059 B2
(45) Date of Patent: Jan. 28, 2014

(54) CONTROL FOR MULTI-PHASE INDUCTION MOTOR

(75) Inventors: Joseph A. Zahora, Oakwood, OH (US); Xung T. Bui, Dayton, OH (US); Brad S. Bryant, Xenia, OH (US)

(73) Assignee: Dayton-Phoenix Group, Inc., Dayton, OH (US)

( * ) Notice: Subject to any disclaimer, the term of this patent is extended or adjusted under 35 U.S.C. 154(b) by 716 days.

(21) Appl. No.: 12/854,392

(22) Filed: Aug. 11, 2010

(65) Prior Publication Data

US 2012/0038309 A1  Feb. 16, 2012

(51) Int. Cl.
    *H02P 1/32* (2006.01)

(52) U.S. Cl.
    USPC ........... 318/779; 318/727; 318/767; 318/771; 318/778

(58) Field of Classification Search
    USPC .......................... 318/727, 767, 771, 778, 779
    See application file for complete search history.

(56) References Cited

U.S. PATENT DOCUMENTS

| | | | | |
|---|---|---|---|---|
| 3,611,088 A | * | 10/1971 | Hill et al. | 318/812 |
| 3,935,519 A | * | 1/1976 | Pfarrer et al. | 388/838 |
| 3,978,382 A | * | 8/1976 | Pfarrer et al. | 318/775 |
| 4,228,846 A | * | 10/1980 | Smorol | 165/240 |
| 6,680,997 B2 | * | 1/2004 | Das | 318/400.09 |
| 2001/0045101 A1 | * | 11/2001 | Graham et al. | 62/236 |
| 2002/0067093 A1 | * | 6/2002 | Das | 310/179 |
| 2002/0101122 A1 | * | 8/2002 | Haines et al. | 310/68 E |

\* cited by examiner

*Primary Examiner* — Kawing Chan
(74) *Attorney, Agent, or Firm* — Thompson Hine L.L.P.

(57) ABSTRACT

A method for controlling operation of a multi-phase induction motor may include transmitting a high-speed operation signal by a master computer for high-speed operation of the motor; receiving the signal by a control signal board, and in response to the signal, the control signal board may sense that the master computer is not simultaneously transmitting a low-speed operation signal, and in response to receiving the high-speed operation signal and not simultaneously receiving the low-speed operation signal, closing delta-to-wye contactors and closing contactors in a power section to transmit power to the motor for high-speed operation, whereby the motor is connected to a source of multi-phase power and operates at high-speed; and the control signal board transmitting a first feedback signal to the master computer that the motor is connected to the source of multi-phase power and is running at high speed.

36 Claims, 4 Drawing Sheets

CONTROL FOR MULTI-PHASE INDUCTION MOTOR

BACKGROUND

The present invention relates to electric motor control systems and more particularly, to control systems for operation of multi-phase induction motors.

Induction motors frequently are used in industrial applications. A common type of induction motor (also known as an asynchronous motor) utilizes multi-phase, typically three-phase, alternating current (AC) to energize the stator coils. In industrial applications, such AC induction motors can be quite large, driven by high current to develop high torque output. It is often necessary to operate such motors in high-temperature, corrosive environments.

One common application for such large induction motors is in diesel-electric locomotives. In such an environment, AC induction motors may be controlled by the master computer that controls the electrical systems for the locomotive. The master computer typically sends operation signals to a control board having a controller that, in turn, operates switches to open and close connections between the motor and a source of three-phase electrical power produced by a diesel-electric AC generator.

In one application, which may be to drive an exhaust or cooling fan for the diesel engine enclosure, the AC induction motor is configured for either high-speed or low-speed operation. In high-speed operation, coils in a wye configuration are connected to a source of three-phase power, and in a low-speed configuration the coils connected in a delta configuration are similarly energized.

When operating such motors that ultimately are controlled by a master computer, it is desirable to avoid a situation in which shorting across coils may occur, as this may damage or burn up the motor. Conditions in which switches may become overheated may occur, which also may damage the system and motor. Further, as a result of operational or programming errors, the master computer may transmit signals to the motor controller for high-speed and low-speed operation simultaneously, which if implemented by the controller would damage the motor and the control system.

Accordingly, there is a need for a control system for an induction motor that is sufficiently robust to operate in harsh environments, and that minimizes the likelihood of motor damage as a result of shorting, high temperature or incorrect operation signals.

SUMMARY

The present disclosure is directed to a method and system for controlling operation of a multi-phase alternating current induction motor that, in some embodiments, may minimize the likelihood of motor damage due to shorting, high temperature and faulty operation signals from a master computer. The system may include a control signal board having a controller that may interface with a master computer and may generate signals that trigger switches to connect a multi-phase induction motor to a source of multi-phase alternating current power. The control signal board may receive operation signals from the master computer and at the same time provide a feedback signal to the master computer that indicates the state of operation of the motor.

In one aspect, the control signal board may be connected to receive a signal from a current sensor that indicates a current overload condition at the motor. This overload condition may be the result of a short or a single-phase operation. In response to such a signal, the control signal board may be programmed to stop the motor immediately to avoid damaging the motor. The control signal board also may be programmed to send a feedback signal to the master computer indicating the existence of the fault condition. In another aspect, the control signal board may be connected to receive a signal from a thermistor that may sense the temperature of the switches in an associated power section. If the sensed temperature exceeds a certain threshold value, the control signal board may be programmed to stop the motor immediately to avoid damage. The control signal board also may be programmed to send a feedback signal to the master computer indicating the existence of this fault condition.

In a further aspect, the control signal board may detect a condition in which the master computer sends a high-speed operation signal and a low-speed operation signal to the controller simultaneously. In such an event, the controller may be programmed to send a feedback signal to the computer indicating that error condition. Also, the controller may be programmed to ignore such signals and continue to run the motor at the then-current speed.

In one aspect of the system, the controller may operate in a standby loop in which the presence of signals indicating the aforementioned conditions of current overload, switch temperature and receipt of simultaneous high and low-speed signals from the master computer may be monitored constantly. If signals indicating that any of such conditions are present, the control signal board may send a feedback fault signal to the master computer. The control signal board may be programmed not to power the motor in response to a start signal from the master computer if any of such conditions exist.

In another aspect, the control signal board may operate in a running loop during motor operation. During the running loop, signals that may indicate the fault conditions of current overload and excessive switch temperature are constantly monitored. If one of such fault condition exists, the controller of the control signal board may stop the motor immediately, and may send a feedback signal to the master computer indicating the fault condition. Also during the running loop operation, the control signal board may monitor the operation signal transmitted by the master computer to insure that a high-speed operation signal is present. If the high-speed signal is not present, then the controller may cut the power to the motor and send a feedback signal to the master computer indicating this condition.

Such operational loops by the control signal panel may be performed both for high-speed operation, when the motor is energized in a wye configuration, and in a low-speed operation in which the motor is energized in a delta configuration.

Also in one aspect of the disclosed system, the control signal board may be isolated from the power section by optical isolators. The power section may employ banks of silicon-controlled rectifiers (SCRs) to perform the operation of switching power on and off to the motor.

Other aspects and advantages of the disclosed method and system may be apparent from the following description, the accompanying drawings and the appended claims.

DETAILED DESCRIPTION

Figure 1:
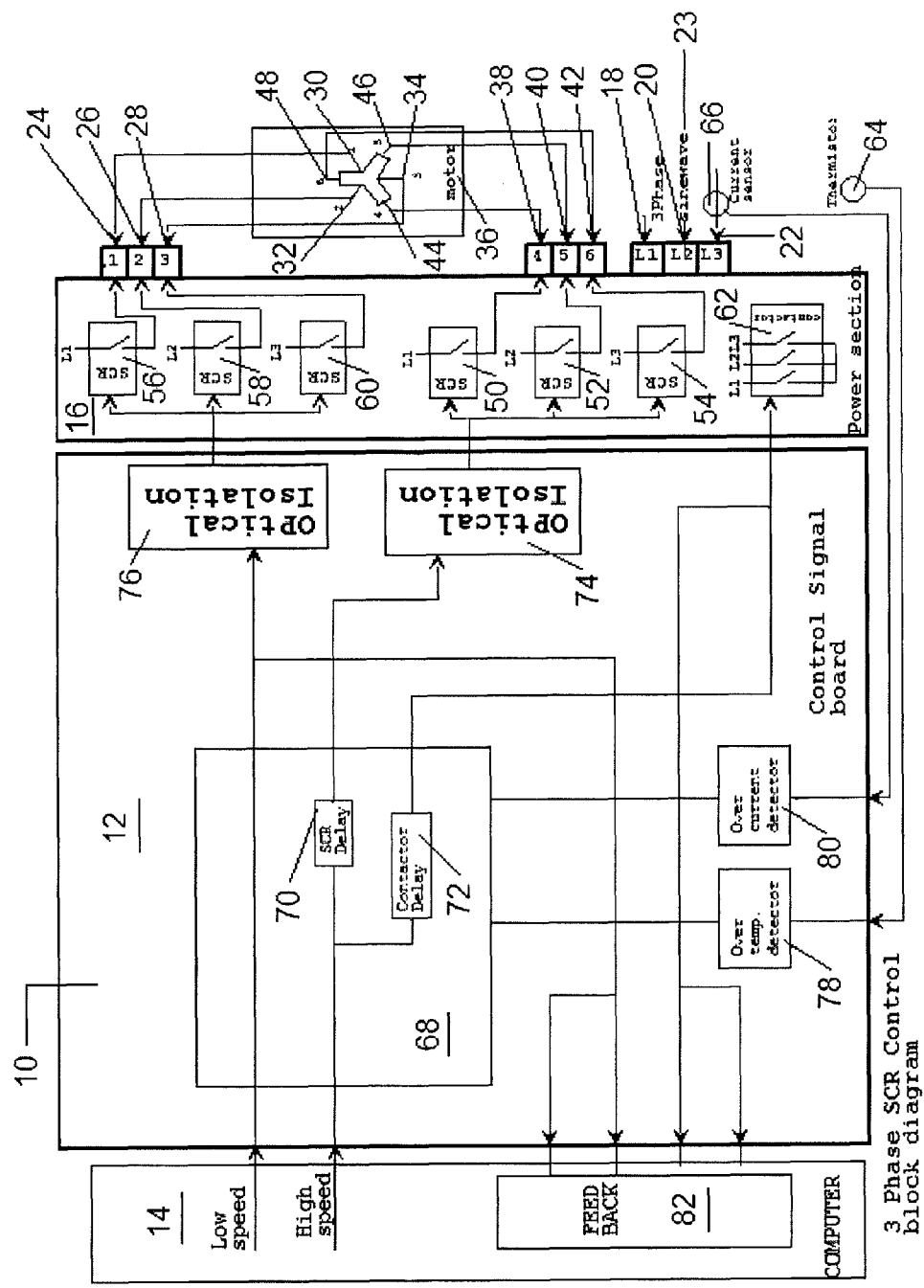
FIG. 1 is a schematic diagram of the disclosed control for a multi-phase induction motor, shown connected to receive three-phase AC power.

As shown in FIG. 1, an exemplary control, generally designated 10, for a multi-phase induction motor. The control 10 may include a control signal board, generally designated 12, that may interface with a master computer, generally designated 14, and a power section 16. The power section 16 may include terminals 18, 20, 22 that are connected to a source of multi-phase alternating current, such as a source of three-phase alternating current 23. Typically, in a locomotive environment, the source 23 of three-phase power may be supplied from a diesel-electric generator (not shown) at 400 volts. Both frequency and voltage from the diesel-electric generator are determined by the diesel engine RPM. The diesel-electric generator operates in a constant volts-per-hertz fashion. The power section 16 may include terminals 24, 26, 28 that connect to stator terminals 30, 32, 34 of AC induction motor 36 for a delta stator configuration. Similarly, terminals 38, 40, 42 of the power section 16 may be connected to terminals 44, 46, 48, respectively, of motor 36 in a wye stator winding configuration. In one aspect, the motor 36 may be a cooling fan motor for a diesel-electric engine, but the disclosed control 10 may be used in a variety of environments and applications.

Switches, such as silicon controlled rectifier (SCR) pairs 50, 52, 54 of power section 16, may be connected to inputs 18, 20, 22, respectively, and to terminals 38, 40, 42, respectively. Thus, SCR pairs 50, 52, 54 control current flow to terminals 44, 46, 48, respectively.

SCR pairs 56, 58, 60 of power section 16 may be connected to terminals 18, 20, 22, respectively, and to terminals 24, 26, 28, respectively. Thus, SCR pairs 56, 58, 60 may be closed to direct power to terminals 30, 32, 34 of motor 36 to energize a delta configuration. Other switches may be employed, such as other types of solid-state switches or thyristors.

Power section 16 also may include contactor 62 for switching the motor 36 between delta and wye stator winding configurations. Power section 16 also may include a thermistor 64 that may be connected to detect the temperature of the SCR pairs 50, 52, 54, 56, 58, 60, and a current sensor 66, which may be connected to sense the current to the power section and to the motor 36.

The control signal board 12 may include controller 68 having an SCR delay 70 and a contactor delay 72. The controller 68 is connected to the master computer 14 to receive a high-speed signal through high-speed input 73 and a low-speed signal through low-speed input 74. The controller 68 may be connected to actuate SCR pairs 50, 52, 54 through optical isolator 75, and connected to actuate SCR pairs 56, 58, 60 through optical isolator 76. The control signal board 12 also may include an over-temperature detector 78 that receives a signal from the thermistor 64 and is connected to the controller 68. Control signal board 12 also may include an over-current detector 80 that may be connected to and receive a signal from current sensor 66 and transmits a digital signal to controller 68.

The control signal board 12 also may be connected to a feedback module 82 of the master computer 14. Signals representing fault conditions (over temperature and over current), and the status of motor operation (high-speed, low-speed, off) may be transmitted from the control signal board 12 to the feedback module 82.

Figure 2:
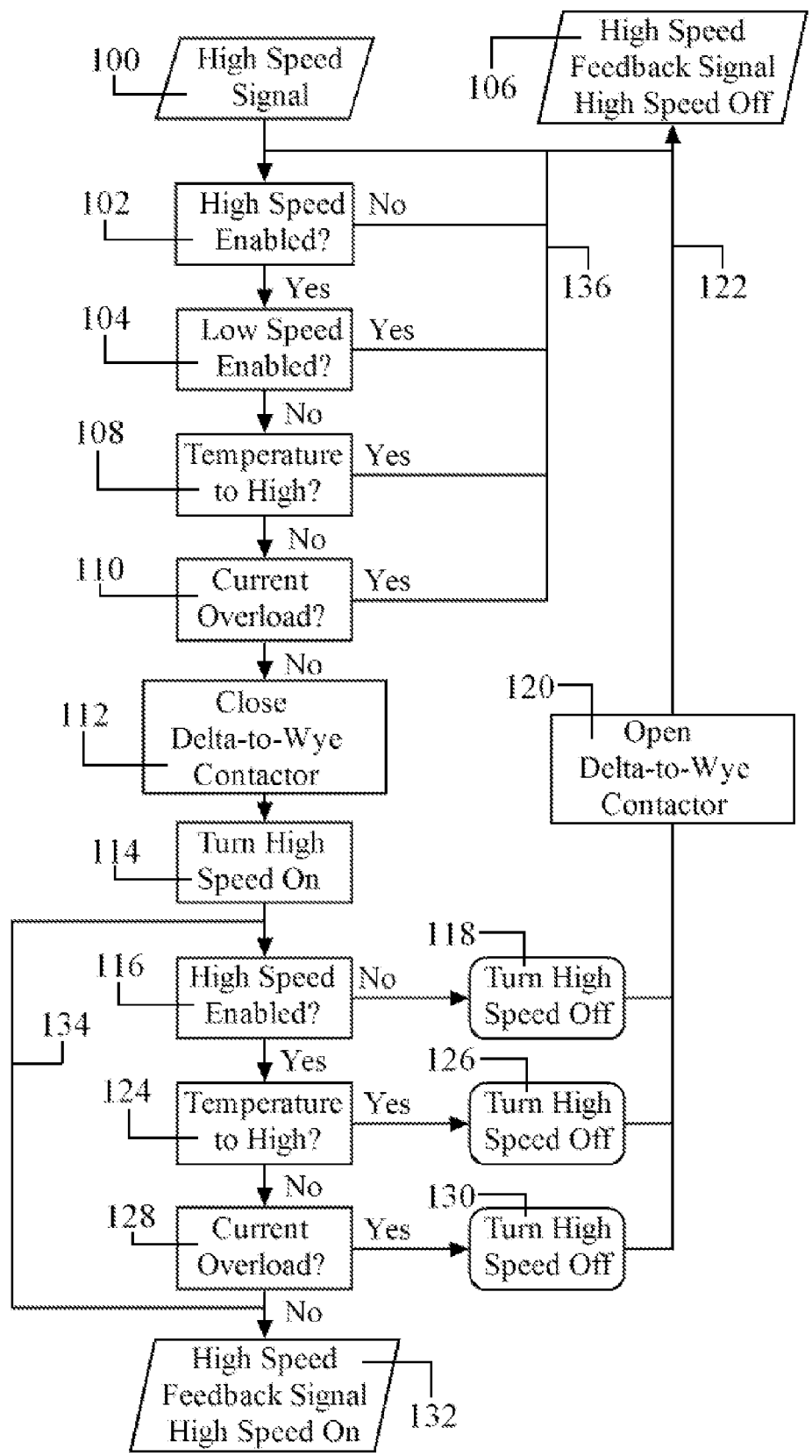
FIG. 2 is a flow chart showing operation of the control circuit board of the system of FIG. 1 for high-speed motor operation.

The operation of the system 10 described with reference to FIG. 1 in high-speed mode is shown in FIG. 2. As indicated in block 100, the control signal board 12 (see FIG. 1) may receive a high-speed enable signal from master computer 14 to high-speed input 74, indicating that the system 10 is to operate the motor 36 at high-speed. This high-speed enable signal may be generated continuously by the master computer 14 as shown in diamond 102. The controller 68 of control signal board 12 may receive the high-speed signal and, as indicated in diamond 104, determine whether a low-speed enable signal is being transmitted simultaneously by master computer 14 to low-speed input 73. If no high-speed signal is enabled, as shown in diamond 102, the control 68 may generate a feedback signal, indicated at block 106, that is sent to the feedback module 82 of master computer 14 to signal the master computer of this condition. The controller 68 may not enable high-speed operation of the motor 36 in this condition, as indicated in block 106.

If, as shown in diamond 104, a low-speed signal is also generated by the master computer and received by the controller 68 simultaneously with the high-speed signal, as indicated in block 106, the control 68 may send a feedback signal to feedback module 82 to turn off the high-speed signal. As indicated in diamond 108, if a high-speed signal is generated and no low-speed signal is present, the control 68 may then determine whether the temperature of the switches 50-60 is within an acceptable temperature range. This signal may be transmitted from thermistor 64, through over-temperature detector 78 to control 68. As indicated in diamond 108, if an over-temperature condition exists, the control may generate a feedback signal to feedback module 82, as indicated in block 106, to indicate this state. The controller 68 will not enable high-speed operation of the motor 36 with the presence of this fault condition.

As shown in diamond 110, the control 68 also may detect a current signal sent from sensor 66 through over-current detector 80 to control 68. If an overload fault condition exists, then, as indicated in diamond 110, a feedback signal indicative of this fault condition may be sent from the controller 68 to feedback module 82, and the controller may turn off the high-speed operation signal, as indicated in block 106, and shut off motor 36. If no current overload conditions exist, as indicated in diamond 110, the control 68 may close the delta-to-wye contactor, as indicated in block 112. This represents a signal from control 68 through optical isolator 74 to actuate SCR pairs 50, 52, 54 to energize the wye windings 44, 46, 48 of motor 36 for high-speed operation. This high-speed operation is indicated in block 114. In order to prevent closing contactors in power section 62 while energized, SCR delay 70 delays energizing the windings by delaying the closing of SCR pairs 50-54 until after the contactors of the power section have closed. This is indicated by contactor closing block 112 occurring before closing high-speed SCR block 114 in the flow chart of FIG. 2.

At this point, the motor 36 is operating at high-speed. During high-speed operation, as indicated in diamond 116, the control 68 may continue to monitor the high-speed signal, which may be transmitted continuously by master computer 14. If that signal stops, as indicated in block 118, the controller 68 may actuate SCR pairs 50-54 to cut power to the motor 36. Also, as indicated in block 120, subsequent to opening SCR pairs 50-54, the control 68 may open the delta-to-wye contactor 62 of power section 16. The delay in opening the contactor is effected by contactor delay 72. The control 68 also may generate a feedback signal indicated at 122 so that the system operates in a standby mode that begins with diamond 102 and continues as described previously.

Similarly, as indicated in diamond 124, during operation of the motor 36 at a high-speed configuration, the switch temperature may be monitored by way of thermistor 64 and over-temperature detector 78. In an over-temperature fault situation, as indicated in block 126, the control 68 may actuate SCR pairs 50-54 to cut power to motor 36, and as indicated in block 120, also subsequently open the delta-to-wye contactor 62 of power section 16, which is delayed by contactor delay 72. The system then, as indicated in feedback loop 122, may enter a standby mode, which may begin with diamond 102 with the control 68 waiting for a high-speed operation signal from master computer 14.

As indicated at diamond 128, during motor operation, the current to the motor may be constantly monitored by current sensor 66, and if an over-current situation occurs, over-current detector 80 may send a signal to control 68. In such an instance, as indicated in block 130, the control 68 may actuate SCR pairs 50-54 to cut power to the motor and, as indicated in block 120, subsequently may open the delta-to-wye contactor 62, delayed by contactor delay 72. Again, as indicated with feedback 122, the system may enter a standby mode that begins with waiting for a high-speed signal, as indicated at diamond 102.

As indicated at block 132, the controller 68 of control signal board may provide a feedback signal to feedback module 82 of computer 14 constantly during operation that the motor 36 is operating at high-speed. This high-speed feedback signal occurs only if, as shown in FIG. 2, a high-speed signal is being received from the master computer 14 and fault conditions do not exist: the switch temperature is within acceptable limits and the current to the motor 36 is not in an overload condition. As indicated by arrow 134, during high-speed operation of the motor 36, the controller 68 may operate continuously in a running loop in which the high-speed signal from the master computer 14 is detected, shown in diamond 116, temperature is monitored, as indicated in diamond 124, and current is monitored, as shown in diamond 128.

Similarly, prior to motor operation, the system may be configured to operate controller 68 in a standby loop, as indicated by line 136, in which the controller may wait to receive a high-speed signal, indicated at diamond 102, or a low-speed signal, indicated at diamond 104. Temperature and current also may be monitored at this time, as indicated by diamonds 108, 110, respectively.

Figure 3:
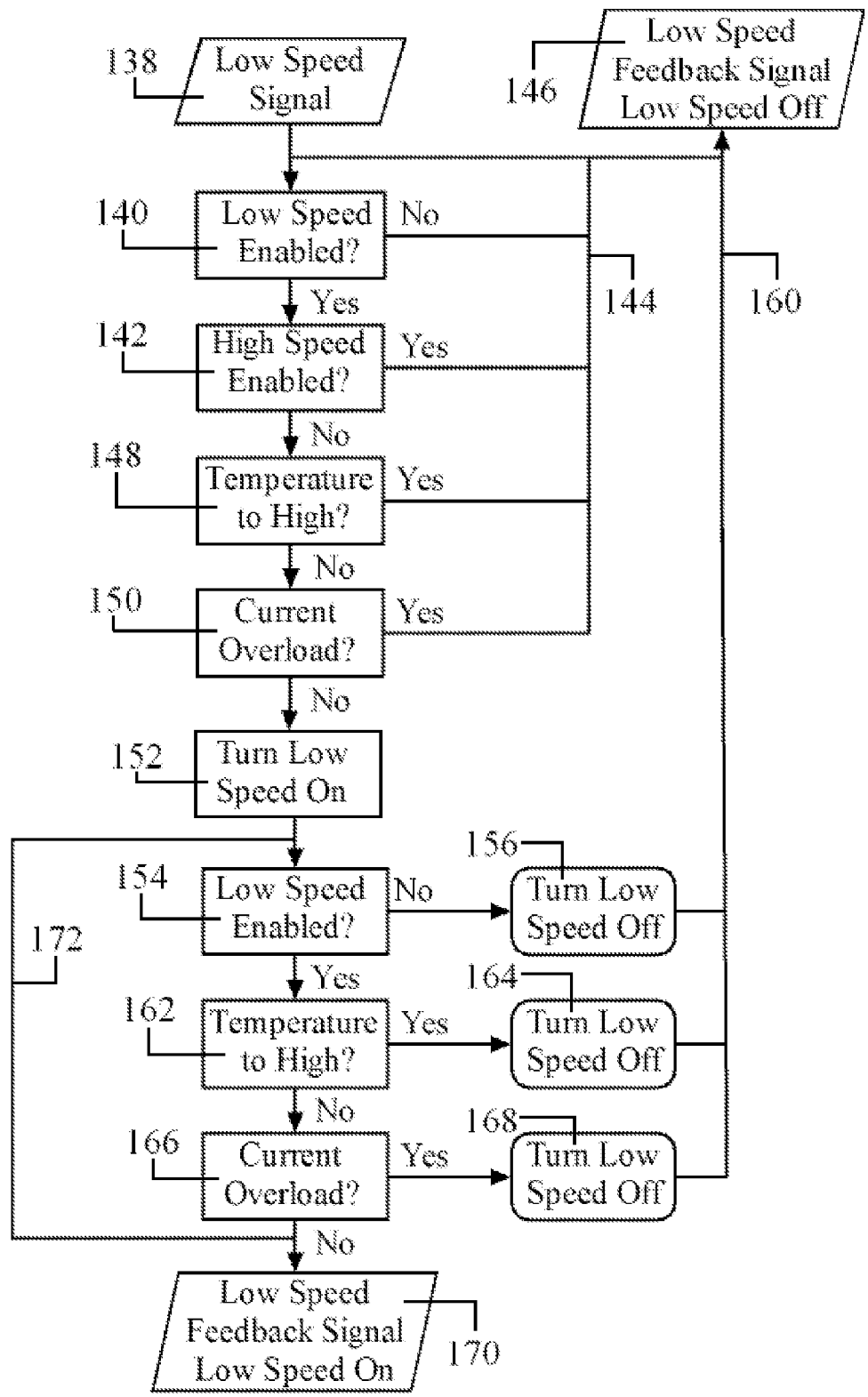
FIG. 3 is a flow chart showing operation of the control circuit board of the system of FIG. 1 for low-speed motor operation.

As shown in FIG. 3, the system may be configured to operate the motor 36 at a low-speed. This mode of operation may begin, as indicated in block 138, with receipt by the controller 68 of a low-speed signal from master computer 14 through input 73 (see FIG. 1). As indicated in diamond 140, the controller 68 may confirm that a low-speed signal is being received from the master computer 14 and, as indicated in diamond 142, verify that a high-speed signal is not being transmitted by master computer 14 through input 74 simultaneously. In the event that the low-speed signal ceases, as indicated by feedback loop 144, the control may generate a low-speed feedback signal, indicated at block 146, to tell the master computer 14 that the low-speed signal has stopped. In this situation, the controller 68 does not operate the motor 36, as indicated in block 146.

If only a low-speed signal is being transmitted, then, as indicated in diamond 148, prior to operation the system may monitor the temperature of the SCR pairs 56-60 by way of thermistor 64. If the temperature is within an acceptable range and not in a fault condition, then the controller 68 may monitor the presence of a current overload, as indicated by diamond 150. If either a fault condition exists with respect to switch temperature, or a fault condition exists with respect to a current overload, then, as indicated by feedback loop 144, a feedback signal may be sent to the feedback module 82 of computer 14 indicating this fault condition. Also, the controller 68 may stop low-speed operation of the motor 36, as indicated at block 146. In the event that no fault condition exists, then, as indicated at block 152, the control 68 may send a signal through optical isolator 76 to close SCR pairs 56-60 to energize motor 36 in a low-speed or delta configuration.

During operation, the controller 68 may continue to receive low-speed signals from the master computer 14, as indicated in diamond 154. In the event that these signals cease, as indicated in block 156, the controller 68 turns off the power to the motor 36 by actuating SCR pairs 56-60 and generates a feedback signal 160 to the master computer 14 indicating this condition, as indicated at block 146.

Similarly, as indicated in diamond 162, the controller 68 receives a temperature signal from thermistor 64 in the event of an over-temperature fault condition. In the event of such condition, as indicated in block 164, the controller 68 may open SCRs 56-60 to cut power to the motor 36 and generate a signal to the master computer 14 indicating condition. This signal may be transmitted by way of feedback signal 160.

Further, during operation of the motor 36 in a low-speed configuration, the controller 68 may monitor the current to the motor, as indicated at diamond 166, and if a fault condition occurs, such as may occur with a short across the motor winding, the controller 68 may actuate SCR pairs 56-60 to turn off the motor 36, as indicated at block 168. At the same time, a feedback signal 160 may be sent by controller 68 to the feedback module 82 of computer 14, as indicated in block 146. The controller 68 then enters standby loop 144, in which the controller waits to receive a signal from the computer 14 that low or high-speed motor operation is enabled (blocks 140, 142, respectively) and temperature and current are not in fault conditions (blocks 148, 150, respectively).

If no fault condition exists, then as indicated in block 170, the controller 68 may generate a feedback signal to the computer feedback module 82 that the motor 36 is operational at low-speed. As indicated at 172, during operation the controller 68 may operate in a running loop during which the continued receipt of a low-speed operation signal (diamond 154), high temperature fault condition (diamond 162) and current overload (block 166) fault conditions may be monitored continuously by the controller. Similarly, prior to motor operation, as indicated at 144, the controller 68 may operate in a standby loop during which the controller waits for a low-speed signal, indicated at diamond 140, or a high-speed signal, indicated at diamond 142, and also monitors temperature and current fault conditions, as indicated at diamonds 148, 150, respectively.

Figure 4:
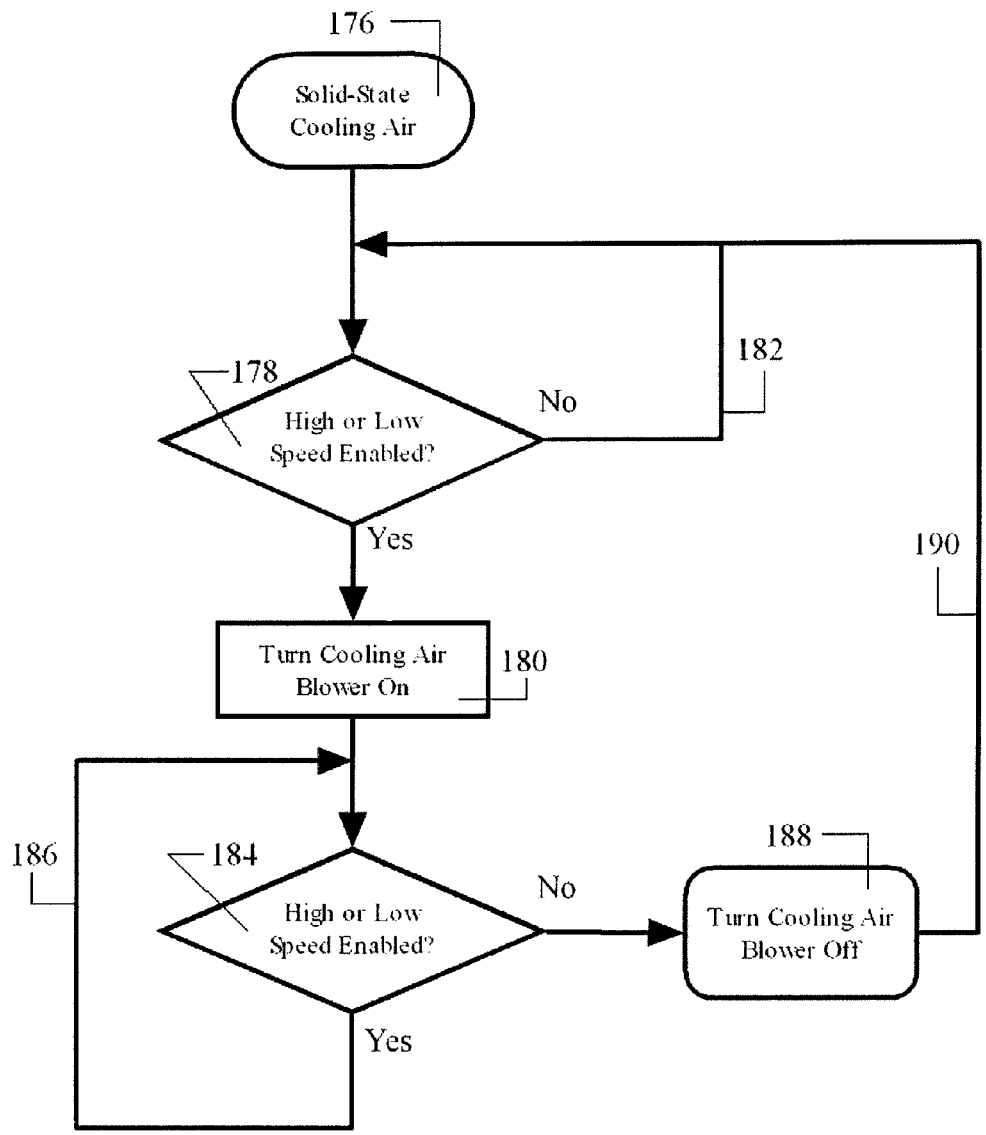
FIG. 4 is a flow chart showing operation of a cooling fan by the system of FIG. 1.

As shown in FIG. 4, the controller 68 may be used to actuate cooling air, indicated at block 176. If, as indicated in diamond 178, high or low-speed operation is enabled, then the controller 68 may actuate a cooling air blower, indicated at block 180. If not receiving an operations signal, as indicated at diamond 178, the system 10 may enter a standby mode in which the receipt of a signal is monitored, as indicated at 182.

During operation of the cooling air blower, as indicated at diamond 184, the system may continue to monitor the receipt of a high or low-speed operation signal. If either such signal is received, the cooling air blower continues to operate and the system operates in a running loop, indicated at 186. However, if the high or low-speed signal is not received, then as indicated at block 188, the controller 68 turns off the blower and enters a standby mode, as indicated at 190.

The disclosed system 10 and method for operating a multi-phase, multi-speed induction motor is designed to minimize damage to the motor that might result from a fault condition such as a current overload or from overheated switches. Thus, the system 10 may protect not only the motor 36, but the power section 16 and control signal board 12 itself. Further, the master computer 14 receives feedback signals from the control signal board 12 at all times during operation so that the state of the motor 36 and the condition of the system 10 may be displayed to an operator on a display screen (not shown) connected to the master computer.

While the form of apparatus and methods disclosed constitute preferred embodiments, it is to be understood that variations of the apparatus and methods may be made therein without departing from the scope of the invention.

What is claimed is:

1. A method of controlling operation of a multi-phase induction motor comprising:
   transmitting a high-speed operation signal by a master computer for high-speed operation of said motor;
   receiving said high-speed operation signal by a control signal board, and in response to said high-speed operation signal, said control signal board
      sensing that said master computer is not simultaneously transmitting a low-speed operation signal, and
      in response to receiving said high-speed operation signal and not simultaneously receiving said low-speed operation signal, closing delta-to-wye contactors and closing contactors in a power section to transmit power to said motor for high-speed operation, whereby said motor is connected to a source of multi-phase power and operates at high-speed; and
   said control signal board transmitting a first feedback signal to said master computer that said motor is connected to said source of multi-phase power and is running at high speed.

2. The method of claim 1, further comprising receiving a first signal by said control signal board from a first sensor indicating a first fault condition, and in response to said first fault condition signal, transmitting by said control signal board a second feedback signal to said master computer indicating existence of said first fault condition.

3. The method of claim 2, further comprising said control signal board opening said contactors in said power section in response to said first fault condition signal, whereby said motor is disconnected from said source of multi-phase power.

4. The method of claim 3, further comprising said control signal board opening said delta-to-wye contactors in response to said first fault condition signal.

5. The method of claim 4, wherein said opening said delta-to-wye contactors occurs subsequent to said opening said contactors in said power section.

6. The method of claim 2, wherein said first fault condition includes a temperature of said contactors in said power section exceeding a predetermined value as sensed by said first sensor.

7. The method of claim 2, wherein said first fault condition includes a current to said motor exceeding a predetermined value as sensed by said first sensor.

8. The method of claim 7, further comprising, subsequent to said closing said contactors in said power section to transmit power to said motor for high-speed operation, detecting by said control signal board whether said high-speed operation signal continues to be transmitted by said master computer, and detecting whether said master computer simultaneously transmits said low-speed operation signal, and in response to both said high-speed operation signal and said low-speed operation signal being transmitted by said computer simultaneously, sending a feedback signal indicative of a fault condition to said master computer.

9. The method of claim 1, further comprising performing a standby loop by said control signal board; and transmitting a signal to a power section to close said delta-to-wye contactors if a fault condition does not exist.

10. The method of claim 9, wherein said standby loop performing includes said control signal board detecting whether said high-speed operation signal is being transmitted by said master computer;
    detecting whether said low-speed operation signal is being transmitted by said master computer;
    receiving a first signal from a first sensor representative of a temperature of said contactors in said power section; and
    receiving a second signal from a second sensor representative of a current to said motor.

11. The method of claim 10, wherein said transmitting said signal to close said delta-to-wye contactors is performed by said control signal board in response to detecting a high-speed operation signal being transmitted by said master computer, detecting no low-speed operation signal being transmitted by said master computer, said signal from said first sensor indicating that said temperature of said contactors in said power section is below a predetermined value, and said signal from said second sensor indicating that said current to said motor is not in an overload condition.

12. The method of claim 1, further comprising performing a running loop by said control signal board; and if no fault conditions exist, transmitting a high-speed operation feedback signal to said master computer.

13. The method of claim 12, wherein said performing a running loop includes said control signal board
    detecting whether said high-speed operation signal is being transmitted by said master computer;
    receiving a first signal from a first sensor representative of a temperature of said contactors in said power section; and
    receiving a second signal from a second sensor representative of a current to said motor.

14. The method of claim 13, wherein said transmitting said high-speed operation feedback signal to said master computer is performed by said control signal board in response to detecting a high-speed signal being transmitted by said master computer, said first signal from said first sensor indicating that said switch temperature is below a predetermined value, and said second signal from said second sensor indicating that said current to said motor is not in an overload condition.

15. The method of claim 13, further comprising transmitting a second signal by said control signal board to said master computer that a fault condition exists in the event that a fault condition is detected by said control signal board.

16. The method of claim 15, wherein said transmitting said second signal to said master computer is performed by said control signal board in response to detecting at least one of an absence of a high-speed signal being transmitted by said master computer, said first signal from said first sensor indicating that said switch temperature is above a predetermined value, and said second signal from said second sensor indicating that said current to said motor is in an overload condition.

17. The method of claim 16, wherein said transmitting said second signal includes said control signal board opening said delta-to-wye contactor.

18. The method of claim 13, further comprising transmitting a third signal by said control signal board to said master computer that a fault condition exists in response to detecting at least one of an absence of a high-speed signal being transmitted by said master computer, said first signal from said first sensor indicating that said switch temperature is above a predetermined value, and said second signal from said second sensor indicating that said current to said motor is in an overload condition.

19. A system for controlling operation of a multi-phase induction motor, the system comprising:
   a control signal board adapted to receive control signals from a master computer;
   delta-to-wye contactors connected to be controlled by said control signal board, for conducting multi-phase electrical current to windings of said induction motor;
   a power section having contactors connected to be controlled by said control signal board and to direct multi-phase electrical current to a motor;
   said control signal board being programmed to
      receive a high- or low-speed signal from said master computer, and in response to said high- or low-speed operation signal, determine that said master computer is not simultaneously transmitting a low- and high-speed operation signals, and in response to receiving said high-speed operation signal and not simultaneously receiving said low-speed operation signal, closing delta-to-wye contactors and closing contactors in a power section to transmit power to said motor for high-speed operation, whereby said motor is connected to a source of multi-phase power and operates at high-speed; and
      transmit a first feedback signal to said master computer that said motor is connected to said source of multi-phase power and is running at high-speed.

20. The system of claim 19, further comprising a first sensor connected to send a signal indicating a first fault condition to said control signal board; and wherein said control signal board is programmed to receive said signal from said first sensor indicating a first fault condition, and in response to said first fault condition signal, transmit a second feedback signal to said master computer indicating existence of said first fault condition.

21. The system of claim 20, wherein said control signal board is programmed to open said contactors in said power section in response to receiving said first fault condition signal, whereby said motor is disconnected from said source of multi-phase power.

22. The system of claim 21, wherein said control signal board is programmed to open said delta-to-wye contactors in response to receiving said first fault condition signal.

23. The system of claim 22, wherein said control signal board is programmed to open said delta-to-wye contactors subsequent to opening said contactors in said power section.

24. The system of claim 20, wherein said first fault condition includes a temperature of said contactors in said power section exceeding a predetermined value as sensed by said first sensor.

25. The system of claim 20, wherein said first fault condition includes a current to said motor exceeding a predetermined value as sensed by said first sensor.

26. The system of claim 25, wherein said control signal board is programmed to close said contactors in said power section to transmit power to said motor for high-speed operation, detect whether said high-speed signal continues to be transmitted thereto by said master computer, and detect whether said master computer simultaneously transmits said low-speed operation signal thereto, and in response to both said high-speed signal and said low-speed signal being transmitted by said computer simultaneously, sending a feedback signal indicative of a fault condition to said master computer.

27. The system of claim 19, wherein said control signal board is programmed to operate in a standby loop; and to transmit a signal to a power section to close said delta-to-wye contactors in response to the nonexistence of a fault condition.

28. The system of claim 27, further comprising a first sensor for detecting a temperature of said contactors in said power section and transmitting a first signal representative thereof to said control signal board; a second sensor for detecting a current delivered to said motor and transmitting a second signal representative thereof to said control signal board; and wherein said standby loop includes said control signal board being programmed to
   detect whether said high-speed operation signal is being transmitted by said master computer;
   detect whether a low-speed operation signal is being transmitted by said master computer;
   receive said first signal from a first sensor; and
   receive said signal from a second sensor.

29. The system of claim 28, wherein said control signal board is programmed to transmit said signal to said delta-to-wye contactors to close said delta-to-wye contactors in response to receiving a high-speed operation signal from said master computer, not receiving a low-speed signal from said master computer, receiving said first signal from said first sensor indicating that said temperature of said contactors in said power section is below a predetermined value, and receiving said second signal from said second sensor indicating that said current to said motor is not in an overload condition.

30. The system of claim 19, wherein said control signal board is programmed to perform a running loop; and in the event that no fault conditions exist, transmit a high-speed operation feedback signal to said master computer.

31. The method of claim 30, further comprising a first sensor for detecting a temperature of said contactors in said power section and transmitting a first signal representative thereof to said control signal board; a second sensor for detecting a current delivered to said motor and transmitting a second signal representative thereof to said control signal board; and wherein said running loop includes said control signal board being programmed to
   detect whether said high-speed signal is being transmitted by said master computer;
   receive a signal from said first sensor; and
   receive a signal from a second sensor.

32. The system of claim 31, wherein said control signal board is programmed to transmit said high-speed operation feedback signal to said master computer in response to receiving a high-speed operation signal from said master computer, not receiving a low-speed operation signal from said master computer, receiving said first signal from said first sensor indicating that said switch temperature is below said predetermined value, and receiving said second signal from said second sensor indicating that said current to said motor is not in an overload condition.

33. The system of claim 31, wherein said control signal board is programmed to transmit a signal to said master computer that a fault condition exists in the event that said control signal board receives said first or second signals and at least one indicates a fault condition.

34. The system of claim 33, wherein said control signal board is programmed to transmit a low-speed feedback signal to said master computer in response to detecting at least one of an absence of a high-speed signal being transmitted by said master computer, said signal from said first sensor indicates that said switch temperature is above a predetermined value, and said signal from said second sensor indicates that said current to said motor is in an overload condition.

35. The system of claim 34, wherein said control signal board is programmed to open said delta-to-wye contactor in response to detecting at least one of an absence of a high-speed signal being transmitted by said master computer, receiving first signal from said first sensor indicating that said switch temperature is above a predetermined value, and receiving said second signal from said second sensor indicating that said current to said motor is in an overload condition.

36. The system of claim 31, wherein said control signal board is programmed to transmit a third signal to said master computer that a fault condition exists in response to detecting at least one of an absence of a high-speed signal being transmitted by said master computer, said signal from said first sensor indicating that said switch temperature is above a predetermined value, and said signal from said second sensor indicating that said current to said motor is in an overload condition.

* * * * *